United States Patent Office 3,523,575
Patented Aug. 11, 1970

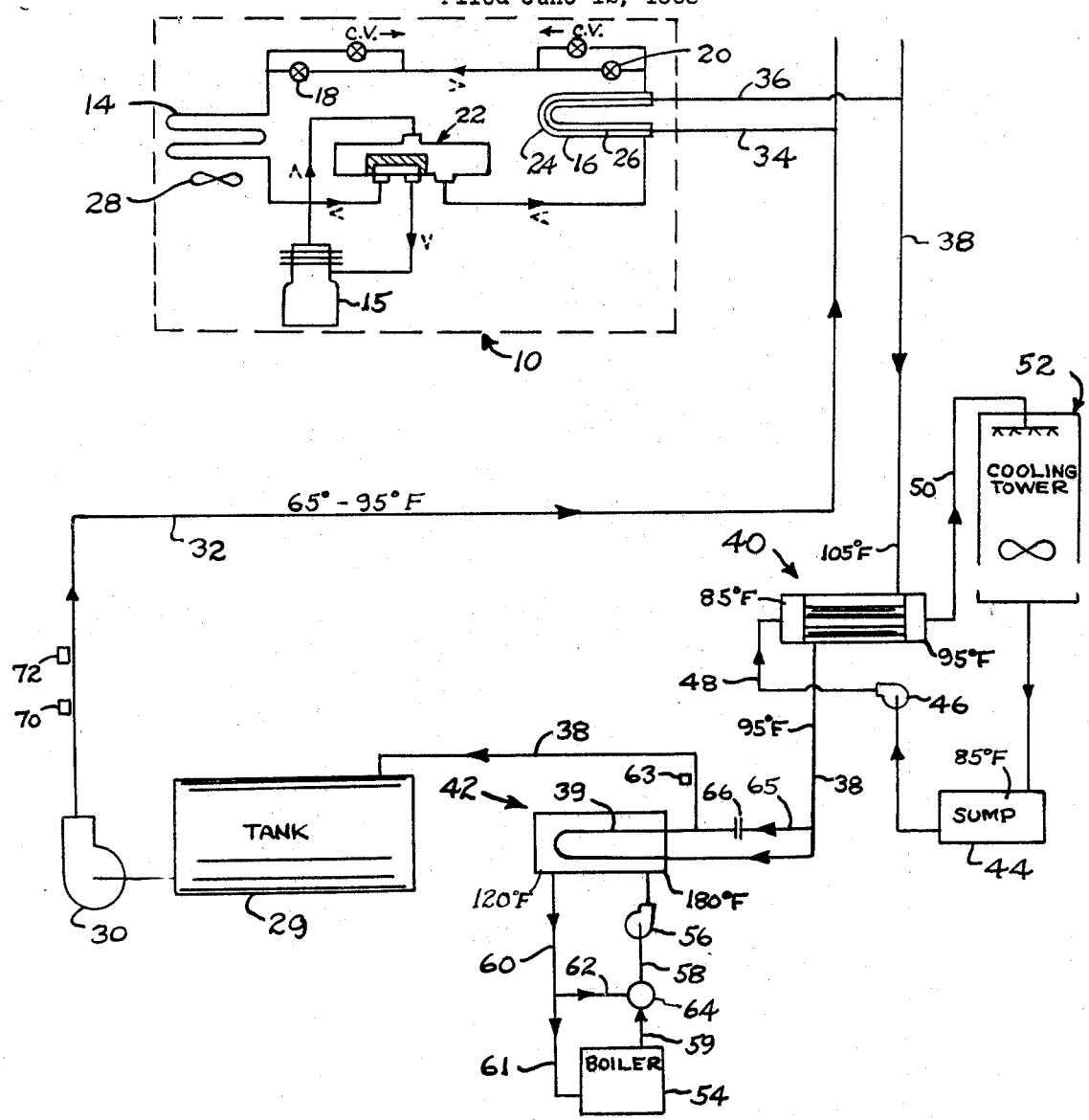

3,523,575
AIR-CONDITIONING SYSTEM HAVING
HEAT STORAGE RESERVOIR
Joseph B. Olivieri, Mount Clemens, Mich., assignor to American Standard Inc., New York, N.Y., a corporation of Delaware
Filed June 12, 1968, Ser. No. 736,416
Int. Cl. F24f 3/00
U.S. Cl. 165—22                                    3 Claims

ABSTRACT OF THE DISCLOSURE

This invention proposes a room cooling-heating system wherein a large number of rooms or spaces can be selectively and individually heated or cooled to the same or different temperatures. The system comprises reversible refrigeration machines in the individual spaces, and a controlled temperature liquid (water) flowing through the various machines to extract heat from the refrigerant. The heated liquid is pumped into a large storage tank and later pumped back through the refrigeration machines to give back to the refrigerant the heat stored in the tank. The cycle is preferably controlled so that the circulating liquid takes heat out of the refrigerant to assist in condensing same, and later adds heat to the refrigerant to evaporate same, the general concept being to reduce the energy requirements of the compressors in the various machines, and the amount of energy required to be transferred to or from the circulating water by central station equipment.

IN THE DRAWINGS

The single figure is a schematic view of a room cooling-heating system incorporating the invention. Numeral 10 represents one of a number of individual reversible refrigeration machines disposed in different spaces or rooms of a building to be heated and cooled, the number of such machines being determined by the nature of the building (motel, school, office building, store, etc.) and the size thereof.

Machine 10 (representative of the others) comprises a refrigerant compressor 15, air coil 14, tube-in-tube coil 16, thermostatic refrigerant expansion valves 18 and 20, and reversing valve 22. Coil 16 includes an outer conduit 24 for refrigerant and an inner conduit 26 for water, the water being continually circulated through conduit 26 to exchange heat with the refrigerant. Coil 14 exchanges heat with air flowing therepast via a fan 28; this air is ultimately delivered to the space to be conditioned. The water flowing through coil conduit 26 does not serve an air heating or air-conditioning function; instead it merely adds heat to or removes heat from the refrigerant in a manner permitting each machine to attain a given performance.

AIR COOLING OPERATION

The full line arrows show the refrigerant flow route during the air cooling cycle. At this time coil 14 acts as a refrigerant evaporator, and coil 16 acts as a refrigerant condenser. As a result the air moving across coil 14 is cooled, while the water flowing through coil conduit 26 is heated by the condensing refrigerant. The energy required to effect the useful air cooling is the heat energy escaping with the water through conduit 26 minus the energy of compression. Therefore if we can make the inlet water temperature relatively low we can increase the heat energy transferred to the water; for a given amount of air cooling we can thus decrease the electrical energy required for compression. One feature of this invention is to economically control this inlet water temperature to effect such a decrease in electric energy consumption.

In an illustrative example we might require 6300 B.tu. per hour air cooling, in which case a suitable entering water temperature for coil 26 might be 70° F. and a suitable leaving water temperature might be 90° F.; the water flow rate might be chosen to be about .9 gallon per minute. The total heat extracted from the refrigerant by the coil 26 water would then be about 9000 B.t.u. per hour. The compressor would be required to add the energy equivalent of about 2700 B.t.u. per hour to provide the necessary 6300 B.t.u. per hour air cooling.

With the above water conditions the refrigerant high side pressure could be on the order of 225 p.s.i., the gaseous refrigerant temperature coming out of the compressor might be about 110° F., and the liquid refrigerant temperature leaving coil 24 might be about 95° F. Expansion valve 18 might be chosen so that its control bulb seeks to maintain a suction line temperature of 50° F., with a superheat of 10° F. The refrigerant pressure in evaporator 14 would then be about 70 p.s.i. Operation would be such that valve 18 would meter sufficient refrigerant to evaporator 14 to maintain the desired evaporator temperature; this assumes that the compressor has to operate continuously to maintain the necessary pressure differential (225 p.s.i. minus 70 p.s.i.).

Assume now that our entering water temperature for coil 26 is 80° F. instead of the previous 70° F. Under these conditions the coil 26 water may be expected to extract less heat from the coil 24 refrigerant; the leaving water temperature might be on the order of 98° F., and the refrigerant temperature coming out of condenser coil 24 might be on the order of 105° F. instead of the previous 95° F. The bulb for expansion valve 18 still wants to maintain a suction line temperature of 50° F. However, the liquid refrigerant supplied to valve 18 is now at a higher energy level (105° F. instead of 95° F.) so that it is able to extract lesser quantities of heat from the air flowing over coil 14. Ultimately this means a greater total flow of refrigerant through coil 14, and/or a consequent inability of the compressor to maintain the desired pressure differential. The net effect is decreased air cooling.

Quantitively the coil 26 water might be expected to extract about 8300 B.tu. per hour from the refrigerant with a coil 26 entering water temperature of 80° F. and a leaving water temperature of 98° F. Assuming the compressor is able to add the energy equivalent of 2400 B.t.u. per hour the useful air cooling is now only (8300 − 2400) or 5900 B.t.u. per hour. It can therefore be seen that a relatively low entering water temperature for coil 26 is desirable for efficient air cooling. If the entering water temperature is unduly high the air cooling in each room unit is lessened so that more room units are required, thus increasing original equipment cost and compressor operation costs. More importantly, if the entering water temperature is above a certain range the machines will not operate because the compressors will not be able to maintain the desired pressure differential.

AIR HEATING OPERATION

When valve 22 is shifted rightwardly the refrigerant follows the path designated by the dotted line arrows. Coil 14 acts as a refrigerant condenser, and coil 16 acts as a refrigerant evaporator. Consequently the air moving across coil 14 is heated by the condensing refrigerant, while the water flowing through conduit 26 is cooled by the evaporating refrigerant. The energy required to effect this air heating action is the energy of compression plus the heat added to the refrigerant by the water flowing through conduit 26. If we can make the inlet water for conduit 26 relatively warm we can increase the amount of heat added to the refrigerant, and in this way decrease the electrical energy (cost) of compression. Therefore, on the air heating cycle most economical operation is attained when we supply warm water. The reasoning follows along the same general lines as discussed above in connection with the air cooling cycle.

As previously noted, on the air cooling cycle most economical operation is attained when we supply the water at a relatively low temperature; on air cooling a somewhat higher supply water temperature is desired. Since each machine is intended to function both as an air cooler and as an air heater we obviously cannot always supply the water at the most desirable temperature. However we attempt to partially achieve such an objective by the process of temporarily storing heat in a large volume storage tank 29; we seek to provide a heat sink of the correct size to store the heat during the daylight hours and give up heat during the night hours.

WATER CIRCULATION LOOP

The complete water circuit comprises tank 29, a continuously operating motor-driven pump 30, main water supply line 32, branch supply lines 34, branch return lines 36, and main return line 38. Line 38 leads through a cooling means 40 and a heating means 42 before discharging back to tank 28.

Cooling means 40 comprises a tube-shell heat exchanger arranged so that line 38 water flows through the shell side, and a coolant flows through the tubes. The coolant circuit includes a sump 44, motor-driven pump 46, supply line 48, exhaust line 50, and cooling tower 52 discharging back to the sump. Pump 46 operation causes relatively cool water to be drawn from sump 44 and passed through the tubes of heat exchanger 40 to extract heat from the line 38 water; the coolant is later recooled to a suitable temperature in tower 52 and returned to sump 44.

Heating means 42 comprises a tube-shell (U-tube) heat exchanger arranged so that line 38 water flows through the U-tubes 39, and a separate heating fluid flows through the shell space around the tubes. The heating fluid circuit includes a gas, electric or oil-fired water heater (boiler) 54, lines 59 and 58 motor-driven water pump 56, the shell portion of unit 42, and return water lines 60 and 61. A temperature responsive controller (not shown) within the boiler 54 controls the heat source to maintain the boiler water at a sufficiently high temperature (for example 200° F.) to produce a sufficient temperature differential across the walls of tubes 39.

Actual flow of water through the shell of unit 42 is possible only upon energization of pump 56, which is controlled by a temperature responsive control 70 responding to the temperature in line 32. Thus, as the line 32 temperature drops to 65° F. pump 56 produces a flow of heating fluid around tubes 39 to thus produce a hotter temperature in line 38 and eventually a higher temperature in line 32.

Tank 29 is interposed between unit 42 and control 70 so that all of the tank water must pass by sensor 70 before the heating effect at 39 is reflected in a temperature change at sensor 70. This minimizes cycling (the number of on-off cycles) which is a major cause of pump failure, valve failure, and control failure.

The water line at 62 is normally closed by valve 64; i.e. valve 64 freely admits flow from line 59 into line 58 but prevents flow from line 62 into line 58. Line 62 becomes important only when the water in line 38 is heated excessively. Should such excessive heating occur a temperature sensor at 63 will cause valve 64 to open line 62 and restrict line 59. Pump 56 will then draw a stream which is tempered by the mixing of line 62 water (at perhaps 120°) and line 59 water (at perhaps 180°); the heating action on tubes 39 will be lessened to prevent undesired heating of the line 38 water above some suitable temperature for example 100° F. The heating of tubes 39 will however be continued as long as sensor 70 calls for heat.

A general feature of the control is that it allows the boiler to operate at relatively high water temperatures and low water flow rates. High boiler water temperatures advantageously prolong boiler heat exchange life because they minimize flue gas condensation. Low water flow rates means a smaller, lower cost boiler.

Heat exchanger 42 is preferably provided with a bypass 65 having a restriction 66 calibrated or adjusted so that a substantial portion of the line 38 water bypasses U-tubes 39. For example, assumnig a total line 38 flow of 900 gallons per minute, we might direct 600 gallons per minute through bypass 64 and 300 gallons per minute through U-tubes 39. This allows the U-tubes to operate at higher temperatures for better heat transfer efficiency, and reduces total pressure drop through the U-tubes (because lesser tubes are required). It also enables us to use a smaller, less costly heat exchanger.

The system temperatures may be controlled by two temperature-responsive controls 70 and 72, control 70 being set to energize pump 56 as the line 32 temperature drops down toward 65°, and control 72 being set to energize pump 46 as the line 32 temperature increases toward 95° F. In the major portion of this temperature range (65°–95°) neither pump is working, and the line 32 temperature is then raised or lowered by the manner in which heat is transferred back and forth between machines 10 and tank 28; as previously noted, pump 30 operates continuously to effect the desired heat transfer.

TANK 29 SIZE SELECTION

The heating and cooling requirements affect the minimum size of tank 29, but not necessarily the maximum size. Thus, if we use too small a tank we will not store enough heat to let the tank most effectively assist in controlling the water temperature in the desired range; if we use too large a tank we may merely spend more initial tank dollars than necessary.

The tank size selection is affected by the fact that the heat loss—heat gain character of buildings differ from building-to-building. Thus, many buildings have substantial heat quantities generated internally by room lighting, electrical equipment, and by people; this heat generation is generally greater in those buildings having large core areas or zones (areas more than fifteen feet from an outside wall). During many periods these generated heat quantities more than offset heat losses. Of course, when the outside temperature is appreciably lower than the inside temperature setting there will be substantial heat losses through the building perimeter walls; additional heat will have to be added to any fresh or make-up air taken into the building for ventilation purposes. However, even when the outside temperature is lower than the inside temperature setting the internal heat gains (principally lighting and people) may more than offset the heat losses (through the walls and into the make-up air). Therefore, many of the room units may be on the air-cooling cycle even though the outside temperature is lower than the room temperature setting.

As indicated above, heat losses and heat gains vary with such factors as the size of the building, the internal lighting load, the number of occupants, and the daily hours of occupancy. Also of some importance is the insulation ability of the walls and the shape of the building. Narrow buildings with relatively large outside wall areas per unit volume have larger heat loss factors than more square or more compact structures in which the ratio of outside wall area to unit volume may be considerably less. For discussion purposes, we might consider a typical rectangular office building having five stories and a plan dimension of fifty feet by two hundred eighty feet. Suppose we desire to light the building with an intensity of six watts per square foot of floor space, and to maintain the internal temperature at 70° F. For discussion purposes we will assume that the building is occupied and lighted twelve hours (8 a.m. to 8 p.m.) and darkened and unoccupied the other twelve hours. In this typical building the following heat loss-heat gain conditions might prevail:

| | Heat Factor (B.t.u./hr.) | |
|---|---|---|
| | Bldg. Lighted and Occupied | Bldg. Dark and Unoccupied |
| Outside Air Temp., ° F.: | | |
| 60 | +1,000,000 | −100,000 |
| 50 | +750,000 | −230,000 |
| 40 | +480,000 | −340,000 |
| 30 | +240,000 | −450,000 |
| 20 | 0 | −570,000 |
| 10 | −250,000 | −680,000 |

In the above chart, a plus sign indicates that excess heat is being generated within the building so that some or all of machines 10 must be on the air cooling cycle to maintain the 70° F. setting; a minus sign indicates that heat is being lost by the building so that some or all of the machines 10 must be on the air heating cycle. The inner core area of the building may require twenty-four hour cooling year round, even when there is a net heat loss factor for the entire building. In some instances, the core area may be cooled by non-reversible refrigeration units or by a central station air handling unit; in any event, the core area cooling system is preferably connected with the illustrated system so that core area heat is rejected to the water going through lines 32 and 38. On a total building evaluation basis we can use the chart figures for calculation of the size of tank 29.

The righthand column in the chart indicates how much heat we must add during night hours, and the lefthand column indicates how much heat we must subtract during the day hours. Our tank size must be chosen so that it stores an appreciable portion of the day-generated heat for subsequent transfer back to the air during the night.

The day-time generated heat taken out of the air by the refrigerant is appreciably less than the heat transferred to the water in each conduit 26. Thus, as previously noted, on the air-cooling cycle the heat transferred to the refrigerant is numerically equal to the heat energy transferred from the conduit 24 refrigerant to the conduit 26 water minus the energy of compression at 15. Under our conditions of operation, the daytime heat transferred to the conduit 26 water is about 1.4 times the heat transferred from the air to the refrigerant. On the air heating cycle the water puts heat energy into the refrigerant; additional energy is put into the refrigerant by each compressor 15 so that numerically the heat transferred to the air is 1.4 times the heat transferred from the tank water to the refrigerant. The day-night water heat balance works out, under our operational conditions to be:

$$1.4\ H_d = H_n/1.4 \qquad H_d = H_n/1.96$$

Where $H_d$ is the heat taken out of the air during day-time operations, and
$H_n$ is the heat put back into the air during night-time operations $H_d$ corresponds to the left column in the previous chart, while $H_n$ corresponds to the right column. We can, therefore, set up another day-night water heat balance chart as follows:

| | Heat Transfer (B.t.u./hr.) | |
|---|---|---|
| | 1.4 $H_d$ | $H_n$/1.4 |
| Outside Air Temp., ° F.: | | |
| 60 | +1,400,000 | −71,000 |
| 50 | +1,050,000 | −164,000 |
| 40 | +670,000 | −243,000 |
| 30 | +336,000 | −321,000 |
| 20 | 0 | −407,000 |
| 10 | | −485,000 |

Storage tank 29 is preferably sized to accept and store only as much of the daylight-generated heat as it can give back to the rooms during the night hours; no added benefits are obtained from a tank which accepts appreciably more daylight-generated heat than it can effectively transfer back to the refrigerant during night hours. In our hypothetical building, charted above, we seek to find the B.t.u./hr. figure at which all the daylight-generated heat (left column) is balanced by the night-consumed heat (right column). On any given day the average daytime temperature may be fifteen or twenty degrees above the average night-time temperature. Therefore, on a day averaging 35° F., the succeeding night-time average temperature might only be 15° F.; the water would then absorb about 500,000 B.t.u./hr. during the day, and would give back almost that many B.t.u./hr. during the night (without the aid of boiler 54). On the basis of this optimum 500,000 B.t.u./hr. heat transfer to and from the water, and a twelve hour daytime storage period, the total heat storage capacity of our tank should be about 6,000,000 B.t.u. We must now translate that into gallons of water.

The 6,000,000 B.t.u. is initially obtained from the room unit refrigerant (via the water flowing through each conduit 26). As previously noted, the refrigerant flow may advantageously be regulated so that during the air cooling cycle the conduit 26 water has its temperature raised approximately twenty degrees (e.g., from 70° F. up to 90° F.) as it traverses the conduit. While the particular room thermostat is satisfied the water will, of course, flow through the respective conduit 26 without any appreciable temperature rise; however, because of the large water mass in the system and the temperature equalization effect of tank 29, we can assume that the total heat quantity put into the water during the daylight operations will effect an approximately twenty degree temperature rise in the entire water mass. Looking at the problem in another way, we can say that we will choose a tank 29 volume which will cause all of the water to have a temperature rise of twenty degrees during the course of the twelve hour daytime operational period.

With the above supposition, we can calculate the minimum volume for tank 29 to be:

$$\text{Tank Volume} = \frac{6{,}000{,}000\ \text{B.t.u.}}{20°\ \text{temp. rise}}$$

$$\times \frac{\text{gal.}}{8.3\ \text{B.t.u}} = 36{,}000\ \text{gallons}$$

This calculation presupposes a particular building having the heat loss-gain characteristics of the chart, a particular occupancy-unoccupancy ratio, a particular internal lighting load, and a particular average room temperature setting. These conditions may differ from building to building; the minimum tank 29 volume will, therefore, vary to some extent. I have found, however, that in average buildings the principal factor to be considered is the lighting load. In general, the minimum tank size in gallons can be roughly estimated by multiplying the hourly day lighting load by a factor of .025. Thus in our illustrative situation, the equation would be:

$$\frac{6\ \text{watts}}{\text{ft.}^2} \times 70{,}000\ \text{ft.}^2 \times \frac{1\ \text{B.t.u./sec.}}{1054\ \text{watts}} \times 3600\ \frac{\text{sec.}}{\text{hr.}}$$

$$\times .025 = \text{tank size in gallons} = 36{,}000$$

Partial benefits can of course be obtained using a lower factor. It is believed that the factor should be at least .015. Thus, advantageous results may be achieved using factors varying between .015 and .025.

SECONDARY ADVANTAGES

The cyclic transfer of heat to and from the system water is secondary beneficial in that the water tends to be colder during the air cooling time period and to be warmer during the air heating time period; this somewhat increases the refrigeration efficiency during the respective periods, as will be appreciated from the previous discussion. At the start of the air cooling cycle, 8 a.m. for example, the water entering each conduit 26 will be at a relatively low temperature, near 70° F., because it has been cooled during the night heating cycle; at the start of the air heating cycle, 8 p.m. for example, the water entering each conduit 26 will be at a relatively high temperature near 90° F. because it has been heated during the day cooling cycle. The result is somewhat improved operating efficiency during each cycle. On a numerical basis this might mean a 10% increase in efficiency over the efficiency of a system without the heat storage tank. This efficiency increase is over and above the cost savings obtained by the previously discussed heat storage feature (i.e., storing the day-generated heat and giving it back at night so that members 40 and 42 work less).

The illustrated system includes certain other inherent advantages, as, for example, rapid changeover from air heating to air cooling, ability to use a low cost water temperature control system, segregation of compressor operating costs for each room unit, easy service or replacement of each room unit without affecting other units, ability to operate without insulation on the water piping, no need for an expensive central water chiller, and no possibility of contaminants getting into the main water circuit because it is closed (cooling tower is in the auxiliary circuit).

Preferably, cooler 40 is located upstream from heater 42 to minimize any fouling tendencies in the cooler 40 tubes. Such fouling can be caused by algae occasioned by the fact that the cooling tower circuit is open to the atmosphere. Algae growth is retarded by keeping the temperatures as low as possible. Such low temperatures may be obtained by locating cooler 40 upstream from heater 42 such that the cooler 40 tube interiors are at relatively low temperatures for as much of the yearly operating period as possible.

I claim:

1. In a room heating-cooling system for the perimeter and core zones of a building, said system being operable to provide simultaneous and selective heating or cooling in at least the perimeter zones, said system comprising a plurality of room conditioning units, at least the perimeter ones of said units comprising reversible refrigeration machines which individually include an air conditioner coil, a water-contacted coil, a refrigerant compressor, and refrigerant control means operable to selectively (1) cause the air coil to act as a refrigerant evaporator and the water coil to act as a refrigerant condenser, or (2) cause the air coil to act as a refrigerant condenser and the water coil to act as a refrigerant evaporator: the improvement comprising a closed water circulation circuit having branches connected with each water-contacted coil to exchange heat with the refrigerant flowing therethrough; said water circulation circuit comprising a continuously-operating pump, the aforementioned water branches, a central water cooling means, a central water heating means, and a central water storage means; said water cooling means, water heating means and water storage means being arranged in series flow relation in the closed water circulation circuit so that heat extracted from the refrigerants in the individual water-contacted coils accumulates in the water flowing through the central storage means; means for energizing the central water cooling means when the temperature of the water in the water storage means rises above a predetermined high temperature setting; means for energizing the central water heating means when the temperature of the water in the water storage means drops below a predetermined low temperature setting; said storage means having a sufficient volumetric capacity, whereby the major portion of the room heat transferred to the water in the air-cooling cycle of each reversible unit is stored in the storage means for transfer back to the refrigerant during the air-heating cycle.

2. The system of claim 1 wherein the storage means has a volumetric gallonage capacity which is approximately .025 times the total daytime hourly lighting load in the building measured in B.t.u.

3. The system of claim 1 wherein the storage means has a volumetric gallonage capacity which is between .015 and .025 times the daytime hourly lighting load measured in B.t.u.

References Cited

UNITED STATES PATENTS

| 2,715,514 | 8/1955 | Stair | 165—50 |
| 2,797,068 | 6/1957 | McFarlan | 165—29 |
| 3,165,148 | 1/1965 | Soule | 165—29 |
| 3,404,728 | 10/1968 | Laube | 165—22 |

WILLIAM J. WYE, Primary Examiner

U.S. Cl. X.R.

165—18, 29, 50, 62